United States Patent [19]

Denny

[11] 4,270,597

[45] Jun. 2, 1981

[54] THERMOSTAT AND CIRCUIT

[75] Inventor: Dann W. Denny, Morrison, Ill.

[73] Assignee: General Electric Company, Fort Wayne, Ind.

[21] Appl. No.: 15,053

[22] Filed: Feb. 26, 1979

[51] Int. Cl.³ .......................................... F25B 29/00
[52] U.S. Cl. ....................................... 165/27; 165/29; 236/1 EA; 236/68 B; 62/202
[58] Field of Search ............................ 165/27, 29, 26; 236/1 EA, 68 B; 62/202; 337/377

[56] References Cited

U.S. PATENT DOCUMENTS

| | | | |
|---|---|---|---|
| 2,978,228 | 4/1961 | Carlson | 165/27 |
| 3,993,120 | 11/1976 | Iberg et al. | 165/26 |
| 4,114,681 | 9/1978 | Denny | 165/26 |
| 4,115,751 | 9/1978 | Huizenga | 337/323 |

Primary Examiner—Albert W. Davis
Assistant Examiner—Margaret A. Focarino
Attorney, Agent, or Firm—Joseph E. Papin

[57] ABSTRACT

A thermostat adapted to regulate the operation of a heating system and a cooling system in response to the temperature in a space conditioned by the systems. The thermostat has a pair of means selectively movable to respective ones of adjusted positions and adapted for sensing the temperature of the space within a preselected temperature range, respectively. A pair of sets of at least three switching means are associated with the sensing means and are operable for controlling the operation of the heating system and the cooling system, respectively. At least three means disposed in heat transfer relation with one of the sensing means are energized in response to the operation of the at least three switching means of one of the sets thereof for supplying anticipation heat to the one sensing means only during the operation of the heating system, respectively, the at least three anticipation heat supplying means being connected generally in star circuit relation with each other and respectively connected in series circuit relation with the at least three switch means.

An electrical circuit for a thermostat is also disclosed.

27 Claims, 5 Drawing Figures

THERMOSTAT AND CIRCUIT

FIELD OF THE INVENTION

This invention relates generally to condition responsive devices and in particular to a three stage thermostat and an electrical circuit therefor.

BACKGROUND OF THE INVENTION

In many geographical locations, it may be advantageous or at least desirable to utilize a conditioning system for a building, such as a home or the like for instance, which utilizes a heat pump having heating and cooling operating modes with a changeover device or means for respectively enabling the heating and cooling operating modes of the heat pump. Further and in conjunction with the heat pump, it may also be desirable to employ an auxiliary heating system, such as for instance an electrical heating apparatus or system, in order to provide comfortable heating of the conditioned space in the event of the occurrence of extreme or colder atmospheric temperatures. Of course, a thermostat which may be located in the conditioned space is necessary to control the operation of the conditioning system in the heating and cooling modes thereof, and in the past, various different types of thermostats were employed to control such conditioning systems of either the heat pump type or the heat pump and electrical heating apparatus combination. One such past thermostat is disclosed in the U.S. Pat. No. 4,114,681 issued Sept. 19, 1978 to Dann W. Denny which is incorporated herein by reference, and a dual thermostat adapted for operation to control the aforementioned conditioning system is disclosed in U.S. Pat. No. 4,115,751 issued Sept. 19, 1978 to Ronald G. Huizenga which is also incorporated herein by reference.

In some conditioning systems, it is advantageous or at least desirable to utilize both the electrical heating apparatus and a heat pump having first and second heating and cooling stages, respectively, with a changeover device to enable the heating and cooling stages or operating modes of the heat pump. Of course, the aforementioned two-stage heat pump is more efficient over a greater range of atmospheric temperatures so as to provide the desired comfortable heating and cooling operation of the conditioning system; however, in the event that colder atmospheric temperatures are encountered, the electrical heating apparatus may also be energized in conjunction with the heating mode operation of the two-stage heat pump. Thus, in the aforementioned conditioning system utilizing both the electrical heating apparatus and the two-stage heat pump with the changeover device therefor, it is necessary to employ a three-stage thermostat to control the heating and cooling operation modes of such conditioning system.

OBJECTS OF THE INVENTION

Among the several objects of the present invention may be noted the provision of an improved thermostat and an improved electrical circuit therefor; the provision of such improved thermostat having heating and cooling modes respectively incorporating at least three operating stages; the provision of such improved thermostat and circuit having means for providing anticipation heat interconnected so as to be selectively energized during the respective operations of the at least three stages in the heating modes; the provision of such improved thermostat wherein the anticipation heat providing means are arranged in preselected positions on preselected components of the thermostat; and the provision of such improved thermostat and circuit which are simplistic in design, economically manufactured, and easily assembled. These as well as other objects and advantageous features of the present invention will be in part apparent and in part pointed out hereinafter.

In general, a thermostat in one form of the invention is adapted for operation in a heating mode and a cooling mode so as to regulate the temperature of a space in which the thermostat may be located. The thermostat has a pair of means which are selectively movable to respective ones of adjusted positions and adapted for sensing the temperature of the space within a preselected temperature range, respectively. A pair of sets of at least three switching means are associated with the sensing means for conjoint movement therewith between a pair of switching positions during the heating and cooling mode operation of the thermostat, respectively. At least three means are disposed in heat transfer relation with one of the sensing means and are energized in response to the operation of the at least three switching means of one of the sets to one of the switching positions thereof for supplying anticipation heat to the one sensing means only during the heating mode operation of the thermostat, respectively. The at least three anticipation heat supplying means are respectively connected in series circuit relation with the at least three switch means, and one of the at least three anticipation heat supplying means is connected in series circuit relation with another one of the at least three anticipation heat supplying means with the one and another one anticipation heat supplying means being connected in parallel circuit relation with a third one of the at least three anticipation heat supplying means.

Also in general and in one form of the invention, an electrical circuit is provided for a thermostat having a pair of means movable therein for sensing the temperature of a given space in which the thermostat may be located. The electrical circuit has a heating branch circuit and a cooling branch circuit adapted to be selectively enabled, and a pair of sets of at least three switch means is associated with the temperature sensing means so as to be operable in response to the movement of said temperature sensing means for controlling the heating branch circuit and the cooling branch circuit upon the selective enablement thereof, respectively. At least three means are connected in the heating branch circuit for supplying anticipation heat to one of the temperature sensing means in response to the movement of the at least three switch means of one of the sets thereof associated with the one temperature sensing means to the respective circuit making positions thereof when the heating branch circuit is selectively enabled. The at least three anticipation supplying means are connected generally in star circuit relation with each other and are respectively connected in series circuit relation with the at least three switch means of the one set thereof.

BRIEF DESCRIPTION OF THE DRAWINGS

Corresponding reference characters indicate corresponding parts throughout the several views of the drawings.

The exemplifications set forth herein illustrate preferred embodiments of the invention in one form thereof, and such exemplifications are not to be construed as limiting the scope of the invention in any manner.

DETAILED DESCRIPTION OF THE PREFERRED EMBODIMENTS

Figure 1:
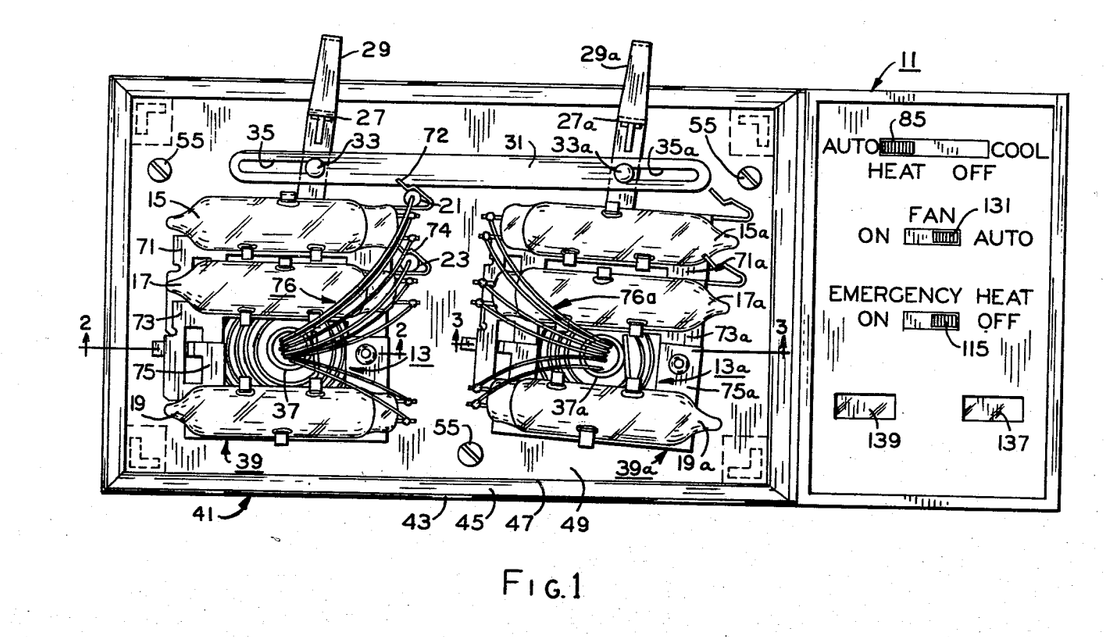
FIG. 1 is a plan view of the thermostat in one form of the invention with a cover portion thereof removed to show the operating components of the thermostat.
Figure 2:
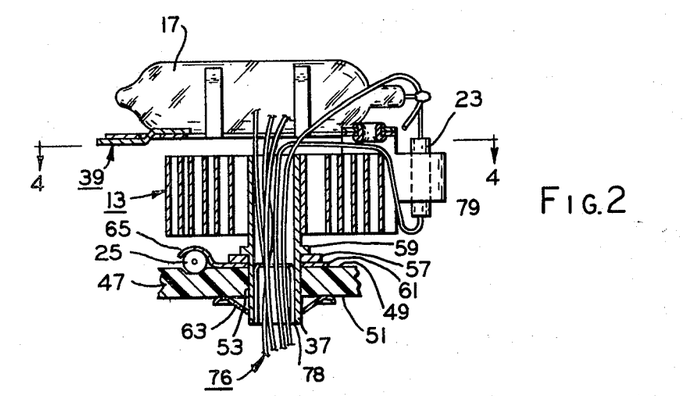
FIGS. 2 and 3 are sectional views taken along line 2—2 and line 3—3 of FIG. 1, respectively.
Figure 3:
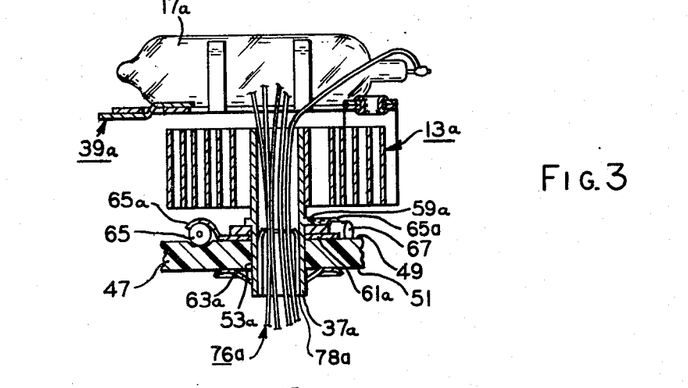
Figure 4:
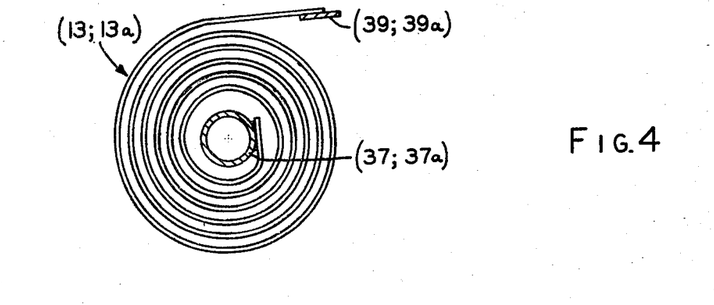
FIG. 4 is a sectional view taken along line 4—4 of FIG. 2 illustrating the configuration of a pair of bimetal elements of the thermostat in FIG. 1.
Figure 5:
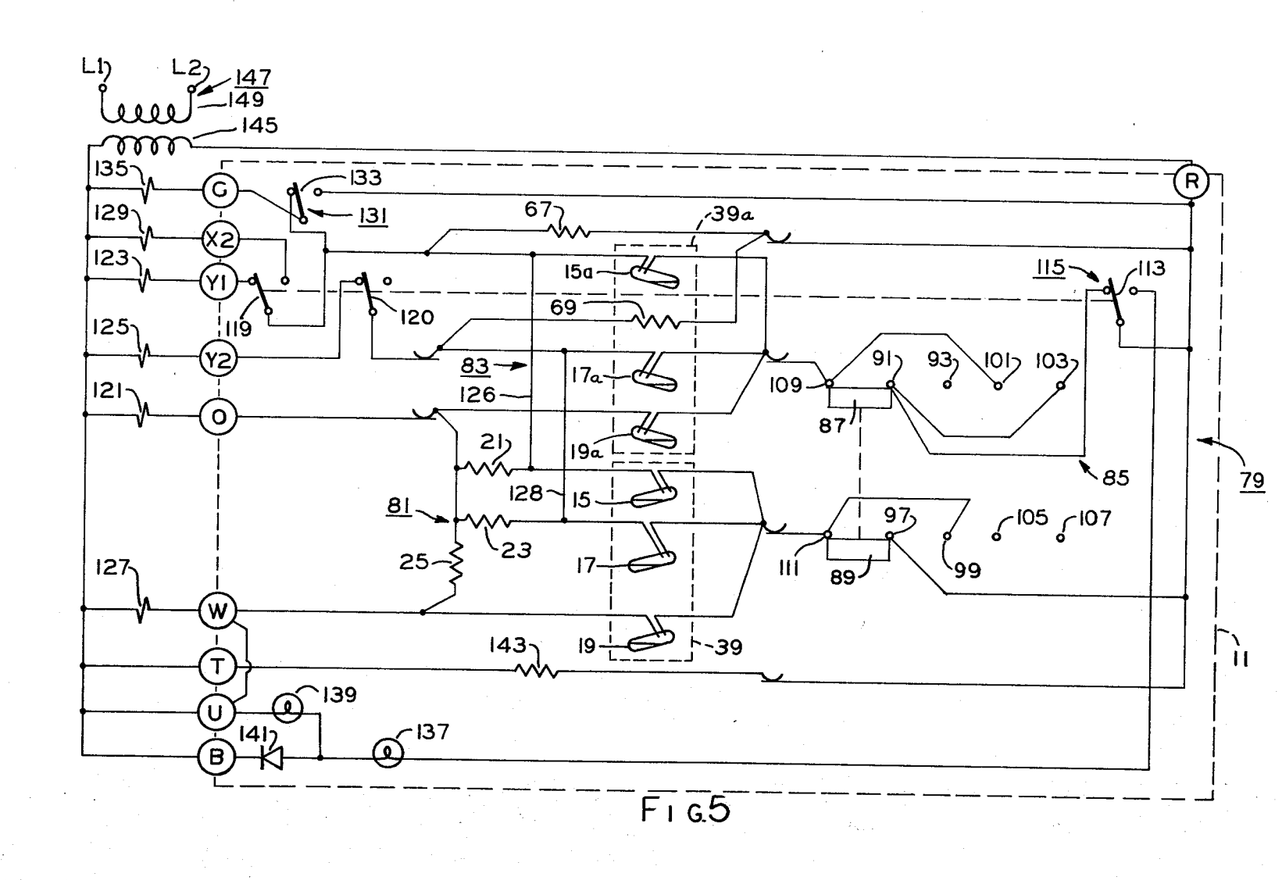
FIG. 5 is a schematic diagram of an electrical circuit in one form of the invention for the thermostat of FIG. 1.

Referring now in general to the drawings, a condition responsive device or thermostat 11 is adapted for operation in a heating mode and a cooling mode so as to regulate or otherwise control the temperature of a given space (not shown) in which the thermostat may be located (FIG. 1). Thermostat 11 has a pair of means, such as bimetal elements 13, 13a for instance, selectively or adjustably movable to respective ones of a plurality of adjusted positions and adapted for sensing the temperature of the space within a preselected temperature range, respectively (FIGS. 1-3). A pair of sets of at least three switching means, such as for instance mercury switches 15, 17, 19 and 15a, 17a, 19a or the like, are associated with sensing means or bimetal elements 13, 13a and are conjointly movable therewith for operation between a pair of switching positions or trip points, i.e. a circuit making or energized position and a circuit breaking or de-energized position, during the heating mode and cooling mode operation of thermostat 11, respectively (FIGS. 1 and 5). At least three means, such as for instance resistors 21, 23, 25 or the like, are disposed in heat transfer relation with bimetal element 13 and are energized in response to the operation of switching means or mercury switches 15, 17, 19 to one of the switching positions thereof, i.e. to the circuit making or energized positions, for supplying or otherwise transmitting anticipation heat to bimetal element 13 only during the heating mode operation of thermostat 11, respectively (FIGS. 1, 2 and 5). Anticipation heat supplying means or resistors 21, 23, 25 are respectively connected in series circuit relation with switches 15, 17, 19, respectively, and one of the resistors, such as resistor 25, is connected in series circuit relation with another one of the at least three resistors, such as resistor 23, and resistors 23, 25 are connected in parallel circuit relation with a third one of the at least three resistors, such as resistor 21 (FIG. 5).

More particularly and with specific reference to FIG. 1, a pair of means, such as for instance heating and cooling temperature indicating arms, levers or temperature selectors 27, 27a, are selectively manually movable within a predetermined or preselected range of temperature settings for setting a selected temperature of the space in which the thermostat may be located. Indicating arms 27, 27a are rotatable or pivotally mounted in thermostat 11, as described in detail hereinafter, and include free ends 29, 29a to which an operator or manual force may be applied to effect the rotational or pivotal movement of the indicating arms to their selected or preselected temperature settings within the predetermined temperature ranges thereof, respectively. Means for effecting lost motion movement between indicating arms or temperature setting means 27, 27a includes means, such as a lost motion strut or connecting link 31 or the like for instance, for connection in lost motion engagement between the indicating arms, and the connection means or connecting link is operable generally in response to the selective manual movement of one of indicating arms 27, 27a toward a preselected temperature setting thereof defining or indicating the selected temperature of the space for driving the other of the indicating arms 27, 27a toward a temperature setting predeterminately displaced from that of the one indicating arm. A pair of abutment means, such as studs 33, 33a or the like for instance, are respectively provided on indicating arms 27, 27a for engagement with connecting link 31. Connecting link 31 includes a pair of spaced apart slots or slot means 35, 35a in which studs or abutment means 33, 33a are slidably received so as to comprise a pair of lost motion connections between the connecting link and indicating arms 27, 27a. In this manner, an operator applied force on one of indicating arms 27, 27a pivotally drives it so as to move or slide one of studs 33, 33a within or through one of slots 35, 35a into driving or lost motion engagement with connecting link 31, and thereafter the other of slots 35, 35a is moved or slid on the other of studs 33, 33a into driving or lost motion engagement therewith. Of course, slots 35, 35a each include a pair of opposite abutment ends or end portions arranged to abut with studs 33, 33a movable therebetween in the slots, respectively. With connecting link 31 so engaged with studs 33, 33a, the one of indicating arms 27, 27a may be moved to its selected temperature setting in response to the manually applied force movement thereof, and the other of indicating arms 27, 27a is conjointly movable therewith toward a temperature setting which is predeterminately displaced from the selected temperature setting indicated by the one of indicating arms 27, 27a within the predetermined temperature range, as previously mentioned. Referring now also to FIGS. 2 and 3, indicating arms 27, 27a are drivingly associated with a pair of rotatable members, such as posts or axles 37, 37a, to which are attached bimetal elements 13, 13a which carry a pair of brackets or cradles 39, 39a for supporting switch means 15, 17, 19 and 15a, 17a, 19a, respectively, as discussed in greater detail hereinafter.

Thermostat 11 is provided with a casing 41 having a plurality of separable casing members releasably retained against displacement from each other, and the casing members include: a base member 43 having a generally planar upper face 45; an intermediate member 47 carried on the base member in spaced relation adjacent its face 45 and having upper and lower generally planar faces 49, 51; and a cover member (not shown) carried on the intermediate member in spaced relation adjacent its upper face 49 and containing at least temperature setting indicia for association with indicating arms 27, 27a. A pair of laterally spaced apart openings 53, 53a are provided through casing intermediate member 47 between its upper and lower faces 49, 51 for rotatably receiving or mounting posts 37, 37a therein, respectively. Suitable means, such as a plurality of screws 55 for instance, may be releasably secured between intermediate and base casing members 43, 47 for releasably maintaining them against separation or displacement from their assembled positions with respect to each other, and the screws may also be utilized as electrical terminals for thermostat 11, if desired.

A pair of means, such as posts 37, 37a, are rotatably disposed within openings 53, 53a of intermediate member 47 for mounting both bimetal elements 13, 13a and indicating arms 27, 27a, and a pair of pivoted ends 57, 57a of indicating arms 27, 27a, which may be bifurcated if desired, are disposed in gripping engagement about posts 37, 37a between a pair of shoulders 59, 59a thereon and a pair of washer-like tabs or bearings 61, 61a through which the posts extend. Thus, posts 37, 37a are conjointly movable or rotatable with indicating arms 27, 27a. Bearings 61, 61a are disposed on upper face 49 of intermediate member 47 generally about openings 53, 53a therein, and a pair of retaining means, such as spring washers 63, 63a or the like for instance, are slidably rotatably received in engagement with lower face 51 of intermediate member 47 about the openings therein so as to be resiliently wedged or releasably engaged with the lower end portions of posts 37, 37a for maintaining the posts against displacement movement generally axially of the openings, respectively. Bearing 61 is provided with means, such as a tab portion or retainer 65, for positioning resistor 25 on upper face 49 of intermediate member 47 generally adjacent bimetal element 13 in anticipation heat transfer relation therewith, and bearing 61a is provided with a pair of means, such as tab portions or retainers 65a, extending therefrom for positioning a pair of anticipation heaters, such as resistors 65, 67 for instance, on the upper face of intermediate member 47 generally adjacent bimetal element 13a, as discussed hereinafter.

Bimetal elements 13, 13a comprise a strip of bimetal material of any suitable type wound or otherwise formed or deformed into a permanent generally spiral shape or configuration and having a pair of generally radially spaced inner and outer ends respectively attached by suitable means, such as spot welds for instance (not shown), to posts 37, 37a and cradles 39, 39a so that an edge of the bimetal elements are spaced adjacent and generally parallel to upper face 49 of intermediate member 47. If a more detailed description of the aforementioned component parts of thermostat 11 and the operation thereof is desired, reference may be had to the aforementioned U.S. Pat. No. 4,115,751.

With reference to FIGS. 1-3, cradles 39, 39a are provided for supporting switch means 15, 17, 19 and 15a, 17a, 19a which may be of the well-known single-pole single-throw mercury switch type for instance, and the switch means are adapted for operation generally between a pair of switching modes at the aforementioned predetermined trip or switching points thereof, i.e. at predetermined degrees of inclination from the horizontal. Of course, it is contemplated that other types of switches, such as double-pole double-throw mercury switches as well as a mixture of the single-pole single-throw and the double-pole double-throw mercury switches, may be used within the scope of the invention so as to meet the objects and advantageous features thereof. Cradles 39, 39a have a pair of sets of legs 71, 73, 75 and 71a, 73a, 75a pivotally arranged with each other for respectively mounting or supporting switch means 15, 17, 19 and 15a, 17a, 19a, and the legs are movable with respect to each other and fixedly arranged in positions establishing or defining the different predetermined trip points of the switch means, respectively. Cradle 39 is provided with a pair of bent over tabs 72, 74 for carrying resistors 21, 23, respectively, so that the resistors are arranged or otherwise disposed in heat transfer relation with bimetal element 13. If a more detailed discussion of the constructions and details of assembly and calibration of cradles 39, 39a is desired, reference may be had to the Dann W. Denny application Ser. No. 937,509 filed Aug. 28, 1978 which is incorporated by reference herein. While a particular construction of cradles 39, 39a is illustrated herein for purposes of disclosure, it is contemplated that other cradles having various other constructions may be utilized within the scope of the invention so as to meet the objects and advantageous features thereof.

A plurality of circuit leads 76, 76a have one of their ends connected with respective contacts of switch means 15, 17, 19 and 15a, 17a, 19a, and the leads pass through a pair of bores 78, 78a provided therefor in posts 37, 37a so that the other ends of the circuit leads are connected by suitable connection means, such as a plurality of busses or other circuit components (not shown) or the like for instance, between lower face 51 of intermediate casing member 47 and base member 43 in an electrical circuit 79 disposed at least in part on base member 43. If a more detailed description of the aforementioned connection means is desired, reference may be had to the Dann W. Denny U.S. Pat. No. 4,114,681 issued Sept. 19, 1978 which is incorporated herein by reference.

Referring again in general to the drawings and recapitulating at least in part with respect to the foregoing, electrical circuit 79 in one form of the invention is provided for thermostat 11 which has bimetal elements 13, 13a movable therein so as to sense the temperature of the given space in which the thermostat may be located (FIGS. 1 and 5). Electrical circuit 79 includes a heating branch or branch circuit 81 and a cooling branch or branch circuit 83 respectively adapted to be enabled, and switch means 15, 17, 19 and 15a, 17a, 19a are associated with bimetal elements 13, 13a and operable generally between circuit making and circuit breaking positions in response to the temperature sensing movement of the bimetal elements for controlling the heating and cooling branch circuits upon the enablement thereof, respectively (FIGS. 1-3 and 5). Resistors 21, 23, 25 are connected in heating branch circuit 81 so as to supply anticipation heat to bimetal element 13 in response to the movement of switch means 15, 17, 19 associated with bimetal element 13 to the respective circuit making positions thereof when the heating branch circuit is enabled, and resistors 21, 23, 25 are respectively connected in series circuit relation with switch means 15, 17, 19 with the resistor being star connected with each other, i.e. one of the resistors is connected in series circuit relation with another of the resistors with such one resistor and another resistor being connected in parallel circuit relation with the third one of the resistors.

More particularly and with specific reference to FIGS. 1 and 5, means, such as a slide switch 85 or the like for instance, is selectively manually movable for enabling heating and cooling branches 81, 83 which, in effect, conditions thermostat 11 for the heating mode and the cooling mode operations thereof, respectively, and while the slide switch is illustrated for purposes of disclosure, it is contemplated that other types of switch devices may be utilized within the scope of the invention so as to meet the objects thereof. Enabling means or slide switch 85 is manually operable to enable heating branch 81 when a pair of mechanically linked contact bars 87, 89 make contact between contacts 91, 93 and 97, 99, respectively, of the slide switch. Other contacts 101, 103 and 105, 107 of slide switch 85 are provided in cooling branch 83 for the enablement thereof when contact bars 87, 89 are respectively made with these contacts. When contact bars 87, 89 are respectively made with contacts 93, 101 and 99, 105 of slide switch 85, the slide switch is in its "off" position thereby to disable both heating branch 81 and cooling branch 83, and another pair of contacts 109, 111 of the slide switch are associated with contacts 91, 97 thereof so that when contact bars 87, 89 are respectively made with contacts 91, 109 and 97, 111, the slide switch is in an "automatic" position thereby to effect an automatic operating mode of thermostat 11 in which both the heating branch and the cooling branch are enabled.

If it is desired to enable cooling branch 83, slide switch 85 may be manually moved to its "cool" position in which contact bars 87, 89 thereof are respectively engaged or made with contacts 101, 103 and 105, 107 of the slide switch. Assuming that indicator arm 27a of thermostat 11 has been manually moved to its set point temperature indicative of the preselected temperature, at least bimetal element 13a is conjointly movable therewith, as previously discussed, to its correlative adjusted position so as to sense temperatures within the predetermined cooling temperature range, say for example in a range above 75° F. When the temperature in the predetermined cooling temperature range sensed by bimetal element 13a is great enough, bimetal element 13a will windup or otherwise move in a counterclockwise direction (as best seen in FIG. 1) about post 37a to a position tilting or otherwise rotating switch means 19a, 15a, 17a to their respective circuit making positions. Thus, power is permitted to flow from thermostat terminal R through one blade 113 of a triple-pole double-throw switch, indicated generally at 115 (in the position thereof shown in FIG. 5) and slide switch 85 in its "cool" position to switch means 19a, 15a, 17a in their respective circuit making positions. From switch means 15a, 17a, the power flows through the another two blades 120, 119 of triple switch 115 (in the positions thereof shown in FIG. 5) and blade 133 of fan switch 131 to thermostat terminals Y1, Y2, G, respectively, and from switch means 19a, the power also flows to thermostat terminal O. Thus, relays 121, 123, 125, 135 connected with thermostat terminals O, Y1, Y2, G, respectively, become sequentially energized as temperature rises. Relay 121 controls a changeover valve or device of a two-stage heat pump (not shown), such as for instance a model BGWA918H1A available from the General Electric Company, Tyler, Texas, and when so energized as discussed above, relay 121 actuates the changeover valve of the heat pump to effect its cooling mode operation. Relays 123, 125 control the first and second stages of the two-stage heat pump, and when so energized after the energization of relay 121, as discussed above, relays 123, 125 effect the cooling operation of the heat pump first and second stages. When switch means 15a, 17a are in their respective circuit making positions, as discussed above, power will be removed from thermostat terminal R to resistors 67, 69 by shorting them out so as to effect their de-energization so as to supply anticipation to bimetal 13a; however, the impedance values of resistors 67, 69 may be of such a chosen value that the desired power flows therethrough. Of course, the cooling mode operation of the first and second stages of the heat pump is effective to reduce the temperature of the given space in which thermostat 11 is located, and upon sensing such reduced temperature, bimetal element 13a moves generally in a counterclockwise direction, i.e. unwinds about post 37a, so as to rotate switch means 17a to its circuit breaking position interrupting the flow of power therethrough. Thus, second stage relay 125 is de-energized to interrupt the cooling mode operation of the second stage of the heat pump, and resistor 69 is then energized to interrupt the anticipation therefrom to bimetal element 13a. Upon further reduction of the temperature in the given space in response to the continued cooling mode operation of the heat pump first stage to the preselected temperature set by indicating arm 27a, such further temperature reduction is sensed by bimetal element 13a which causes further counterclockwise movement thereof about post 37a so as to rotate switch means 15a to its circuit breaking position interrupting the flow of power therethrough. Thus, first stage relay 123 is de-energized to interrupt the cooling mode operation of the first stage generally as the preselected temperature of the space is attained, and resistor 67 is energized to interrupt the anticipation therefrom to bimetal element 13a when switch means 15a is in its circuit breaking position. Of course, thermostat 11 will continue to operate in its cooling mode to cycle the first and second stages of the heat pump in the cooling mode operation thereof in response to fluctuations in the temperature of the given space within the predetermined cooling temperature range, as discussed above.

If it is desired to enable heating branch 81 of electrical circuit 79, slide switch 85 may be manually moved to its "heat" position in which contact bars 87, 89 are respectively engaged or made with contacts 101, 103 and 105, 107 of the slide switch. Of course, such selective movement of slide switch 85 to its "heat" position serves to disable cooling branch 83 effecting the de-energization of relays 121, 123, 125; therefore, with relay 121 so de-energized, the changeover value of the two-stage heat pump is deactuated so as to place the heat pump in its heating mode.

A pair of branch circuit interconnection leads 126, 128 having one end thereof connected between switch means 15 and resistor 21 and between switch means 17 and resistor 23 in heating branch 81 while the other ends of the leads are connected between switch means 15a and blade 119 of triple switch 115 and between switch means 17a and blade 120 of the triple switch, respectively. In effect, interconnection leads 126, 128 provide borrowed paths for the flow of power from heating circuit 81 through a part of cooling circuit 83 upon the operation of the heating circuit, as discussed hereinafter.

Assuming that indicator arm 27 of thermostat 11 has been manually moved to its set point indicative of the preselected temperatures, at least bimetal element 13 is conjointly movable therewith, as previously discussed, to its correlative adjusted position so as to sense temperature within the predetermined heating temperature range, say for example in the range less than 75° F. When the temperature sensed by bimetal element 13 is low enough, bimetal element 13 will windup or otherwise rotate in a clockwise direction (as best seen in FIG. 1) about post 37 toward a position in which switch means 15, 17, 19 are tilted or otherwise rotated therewith to their respective circuit making position. Thus, power flows from thermostat terminal R through slide switch 85 in its "heat" position to switch means 15, 17, 19 in their respective circuit making positions. From switch means 15, 17 the power flows through the borrowed paths provided by branch interconnection leads 126, 128 to blades 119, 120 of triple switch 115 (in the position thereof shown in FIG. 5) and therefrom to thermostat terminals Y1, Y2, and from switch means 19, the power also flows to thermostat terminal W. Thus, first and second stage relays 123, 125 connected with thermostat terminals Y1, Y2 are again energized and another relay 127 controlling the aforementioned electrical heating apparatus (not shown) and connected with thermostat terminal W is also energized. When switch means 15, 17, 19 are in their respective circuit making positions, it may also be noted that resistors 21, 23, 25 are respectively energized so as to supply anticipation heat to bimetal element 13 during the heating mode operation of thermostat 11; however, the impedance values of resistors 21, 23, 25 may be of such a chosen value that little power flows therethrough thereby to obviate the pickup or energization of changeover valve relay 121. With changeover valve relay 121 remaining de-energized so as to place the heat pump in its heating mode, the heating mode operation of the first and second stages of the heat pump in response to the energization of relays 123, 125 and the heating operation of the electrical heating apparatus in response to the energization of relay 127 is effective to increase the temperature of the given space in which thermostat 11 is located. Upon sensing such rising temperatures in the given space, bimetal element 13 moves generally in a counterclockwise direction (as best seen in FIG. 1), i.e. unwinds about post 37, so as to initially rotate switch means 19 to its circuit breaking position interrupting the flow of power therethrough. Thus, electrical heating apparatus relay 127 is de-energized to interrupt the heating operation of the electrical heating apparatus when the temperature of the given space is raised to a preselected low value. Upon further increase in the temperature of the given space in response to the continued heating mode operation of the heat pump first and second stages, said further temperature increase is sensed by bimetal element 13 causing further counterclockwise movement thereof about post 37 so as to successively rotate switch means 15, 17 to the circuit breaking positions interrupting the flow of power therethrough, respectively. Thus, second stage relay 125 is de-energized to interrupt the heating mode operation of the second stage of the heat pump when the rising temperature in the given space attains value predeterminately less than the preselected temperature, and first stage relay 123 is thereafter de-energized to interrupt the heating mode operation of the first stage of the heat pump when the temperature in the given space reaches the preselected temperature as set by indicator arm 27. It may be noted that resistors 21, 23, 25 are also successively de-energized along with relays 123, 125, 127 when switch means 15, 17, 19 are successively moved to their circuit interrupting positions, respectively, as discussed above. When resistors 21, 23, 25 are so successively de-energized, the anticipation heat supply therefrom to bimetal element 13 is successively interrupted. Of course, thermostat 11 will continue to operate in its heating mode to cycle the first and second stages of the heat pump in its heating mode and also the electrical heating apparatus in response to fluctuations in the temperature of the given space within the predetermined cooling temperature range, as discussed above.

In explanation of the purpose of heat anticipators, such as resistors 21, 23, 25, 67, 69, if thermostat 11 would be allowed to respond only to the prevailing temperature of the given space in which it is located, there would be overshoot in both the temperature increasing and decreasing directions with respect to the preselected temperatures set by indicator arms 27, 27a when the thermostat is enabled in the heating and cooling modes thereof. In other words, if thermostat 11 was operable, i.e. set or adjusted, to turn off the cooling mode operation of the heat pump when the temperature of the given space reached 77° F., by way of example, the temperature in the given space might actually be reduced to a value somewhat below 77° F. Conversely, when the heat pump is off, the temperature of the given space may actually rise to a value in excess of a predetermined swing differential based on the 77° F. set point temperature before thermostat 11 would function to effect the cooling mode operation of the heat pump. The variance of temperatures with respect to the preselected temperature set by indicator arm 27a at which thermostat 11 is actually operable is generally referred to as an operating differential or room temperature swing. In order to maintain a low operating differential within acceptable limits or a generally small range, heat anticipators or resistors 21, 23, 25 and 67, 69 are provided to control cycle rate by preheating bimetal elements 13, 13a during the heating and cooling mode operations of thermostat 11, respectively. Thus, bimetal elements 13, 13a will attain the set-point or preselected temperatures so as to limit the overshooting effect and maintain the room or given space temperature operating differential within acceptable limits.

When slide switch is in its "automatic" position with bars 87, 89 engaged between contacts 91, 109 and 97, 111 of the slide switch, either heating branch 81 or cooling branch 83 may be enabled by the selective manual movement of indicator arms 27, 27a so that thermostat 11 may be operated in either the heating mode or cooling mode thereof, as previously described. For instance, if the operator manually adjusts indicator arm 27 to a set-point indicating the preselected temperature within the predetermined heating temperature range, the aforementioned lost motion connection defined by slot means 35, 35a in connection link 31 and studs 33, 33a on indicating arms 27, 27a may be effected so as to move indicator arm 27a toward a temperature setting predeterminately displaced (about 5° F. for example) from the preselected temperature within the predetermined heating temperature range indicated by indicating arm 27. In other words, when the aforementioned lost motion connection is effected between indicating arms 27, 27a upon the manual movement of indicating arm 27, bimetal element 13a is conjointly moved with indicating arm 27a toward an adjusted position tilting switch means 15a, 17a, 19a toward their respective circuit interrupting positions so that any temperature sensing action of bimetal element 13a will not cause the tilting of switch means 15a, 17a, 19a to their respective circuit making positions so long as the temperature of the given space in which thermostat 11 may be located is within the predetermined heating temperature range, i.e. below 75° F. Of course, if the operator manually adjusts indicator arm 27a to a set-point indicating the preselected temperature within the predetermined cooling temperature range (above 75° F.), the aforementioned lost motion connection may also be established through connection link 31 between indicating arms 27, 27a to effect the movement of indicating arm 27 toward a temperature setting predeterminately displaced (about 5° F. for example) from the preselected temperature set by indicating arm 27a within the predetermined cooling temperature range. Thus, in effect, when either indicating arm 27, 27a is driven through the aforementioned lost motion connection, the one of bimetal elements 13, 13a associated with driven indicating arm is rotated toward an adjusted position in which the switch means associated therewith are, in effect, disabled. If a more detailed discussion of the operation of indicating arms 27, 27a in response to the establishment of the aforementioned lost motion connection therebetween is desired, reference may be had to the aforementioned U.S. Pat. No. 4,115,751.

In the event of the occurrence of an emergency heating condition wherein the heat pump is inoperative or down for repairs it is desired to quickly heat the given space, slide switch 85 may be manually moved to its "heat" position, and triple switch 115 may be manually moved to its "auxiliary heat" position (opposite that shown in FIG. 5). Thus, power flows from thermostat terminal R through slide switch 85 in its "heat" position to switch means 15, 17, 19 which will be in the respective circuit making position thereof in response to the low temperature to which thermostat 11 is responding. From switch means 15, the power will flow through branch interconnection lead 126 to blade 119 of triple switch 113 in its "auxiliary heat" position and therefrom to thermostat terminal X2. An emergency heat relay 129 which also controls the aforementioned electrical heating apparatus (not shown) is connected with thermostat terminal X2 so as to be energized upon the occurrence of the above discussed emergency heating condition. It may be noted that the impedance values of resistors 21, 23, 25 are chosen to be greater than that of relay 121 so that such relay does not pickup, i.e. does not become energized, when switch means 15, 17, 19 are in their respective circuit making positions. Thus, while relays 127, 129 may be conjointly energized to effect the heating mode operations of the electrical heating apparatus, relay 129 remains energized so long as switch means 15 is tilted to its circuit making position by the temperature sensing action of bimetal element 13 even though such temperature sensing action of bimetal element 13 may have tilted switch means 19 to its circuit interrupting position thereby to effect the de-energization of relay 127, as previously discussed.

A fan switch 131 is illustrated for purposes of disclosure in FIG. 5 as a single-pole double-throw switch having a blade 133 manually movable between an "automatic" position and an "on" position; however, it is contemplated that other types of fan switches may be employed within the scope of the invention so as to meet the objects thereof. Blade 133 is connected with another thermostat terminal G which is, in turn, connected with a fan relay 135 adapted to control the operation of a fan (not shown). When blade 133 of fan switch 131 is disposed in the "automatic" position thereof fan relay 135 becomes energized when switch means 15, 15a are in their circuit making positions during the above-discussed heating mode and cooling mode operations of thermostat 11 and when switch means 15 is in its circuit making position during the above-discussed emergency heating mode operation of the thermostat. Alternatively, when blade 133 of fan switch 131 is in the "on" position thereof (opposite that shown in FIG. 5), the blade is connected in circuit relation between thermostat terminals R and G so as to effect the energization of fan relay 135 and the continuous operation of the fan.

If desired, means, such as a light bulb 137 for instance, may be illuminated for indicating the "auxiliary heat" mode operation of thermostat 11 when the light bulb is connected in circuit relation between thermostat terminal R and another thermostat terminal B through blade 113 of triple switch 115 when it is in its "auxiliary heat" position. Also if desired, means, such as another light bulb 139 or the like for instance, may be illuminated for indicating that the electric heating apparatus is being operated when the light bulb is connected in circuit relation from thermostat terminal W through another thermostat terminal U and a diode 141 to thermostat terminal B. In addition to the foregoing, an outdoor heat anticipator, such as a negative temperature coefficient resistor 143 or the like for instance of rather low impedance value, i.e. about 20 ohms for example at 25° C., may be associated in heat anticipation supplying relation with bimetal element 13 and connected in circuit relation between thermostat terminal R and another thermostat terminal T.

To complete the description of thermostat 11 and the operation thereof, thermostat 11 is connected across a secondary coil 145 of a conventional step down transformer 147 which has a primary coil 149 connected across a pair of line terminals L1, L2 so as to comprise a power source for the thermostat. Thermostat terminal R is connected to one side of transformer secondary coil 145 while the other transformer terminal and relays associated therewith, as described above, are connected to the other or opposite side of the transformer secondary coil.

From the foregoing, it is now apparent that a novel thermostat 11 and electrical circuit 79 therefor are presented meeting the objects and advantages set out hereinbefore and that changes as to the precise arrangement, shapes, details and connections of the components of the thermostat and electrical circuit, illustrated herein by way of example, may be made by those having ordinary skill in the art without departing from the spirit of the invention or from the scope of the invention as defined by the claims which follow.

What I claim as new and desire to secure by Letters Patent of the United States is:

1. A three stage thermostat adapted to control a conditioning system for a space in which the thermostat may be located with the conditioning system including an electrical heating apparatus, and a heat pump having first and second heating and cooling stages, respectively, and changeover means for respectively enabling the heating and cooling stages of the heat pump, the three stage thermostat comprising:

an electrical circuit having a heating branch and a cooling branch, said heating branch being adapted for connection in circuit relation with the electrical heating apparatus and the first and second heating stages of the heat pump, and said cooling branch being adapted for connection in circuit relation with the changeover means of the heat pump and the first and second cooling stages of the heat pump;

first and second bimetal elements movable in respective ones of a plurality of adjusted positions thereof to sense the temperature of the space, respectively;

first and second sets of at least three mercury switches connected in said heating branch and said cooling branch and associated with said first and second bimetal elements so as to be operable generally at different predetermined trip points in response to the temperature sensing movement of said first and second bimetal elements, respectively, said at least three mercury switches of said first set thereof being adapted at the respective different predetermined trip points thereof to successively effect the energization of the first and second heating stages of the heat pump and then the electrical heating apparatus, respectively, and said at least three mercury switches of said second set thereof being adapted at the respective different predetermined trip points thereof to successively effect the energization of the changeover means of the heat pump and then the first and second cooling stages thereof, respectively;

at least three resistors arranged with said first bimetal element so as to supply anticipation heat thereto, said at least three resistors being connected in said heating branch in series circuit relation with said at least three mercury switches of said first set so as to be energized generally at the different predetermined trip points thereof, respectively, and one of said at least three resistors of said first set being connected in series circuit relation with another resistor of said at least three resistors of said first set with said one and another resistors being connected in parallel circuit relation with a third one of said at least three resistors of said first set;

at least two other resistors arranged with said second bimetal element so as to supply anticipation heat thereto, said at least two other resistors being connected in said cooling branch in circuit relation with said at least three switch means of said second set thereof so as to be energized generally at the different predetermined trip point of one of the at least three switch means of said second set thereof and thereafter successively de-energized at the different predetermined trip points of another two of said at least three switch means of said second set thereof, respectively;

first and second temperature selectors manually movable within a predetermined range of temperature settings so as to set selected temperatures for the space and drivingly associated with said first and second bimetal elements so as to conjointly move them to a respective one adjusted position of the plurality thereof in which said at least three switch means of said first and second sets are operated at the different predetermined trip points thereof in response to the temperature sensing movement of the first and second bimetal means, respectively; and means for effecting disablement of said at least three switch means of one of said first and second sets thereof in response to the manual movement of one of said first and second temperature selectors to set a selected temperature for the space.

2. A thermostat adapted for operation in a heating mode and a cooling mode so as to regulate the temperature of a space in which the thermostat may be located, the thermostat comprising:

a pair of means selectively movable to respective ones of adjusted positions and adapted for sensing the temperature of the space within a preselected temperature range, respectively;

a pair of sets of at least three switching means associated with said sensing means and conjointly movable therewith for operation between a pair of switching positions during the heating and cooling mode operation of the thermostat, respectively; and at least three means disposed in heat transfer relation with one of said sensing means and energized in response to the operation of said at least three switching means to one of said sets to one of the switching positions thereof for supplying anticipation heat to said one sensing means only during the heating mode operation of the thermostat, respectively, said at least three anticipation heat supplying means being respectively connected in series circuit relation with said at least three switch means and two of said at least three anticipation heat supplying means being connected in series circuit relation with each other with said two heat anticipation heat supplying means being connected in parallel circuit relation with another one of said at least three anticipation heat supplying means.

3. A thermostat as set forth in claim 2 further comprising at least two other means disposed in heat transfer relation with the other of said sensing means and energized in response to the operation of one of said at least three switching means of the other of said sets thereof for supplying anticipation heat to said other sensing means only during the cooling mode operation of the thermostat.

4. A thermostat as set forth in claim 3 wherein said at least two other anticipation heat supplying means are de-energized in response to the operation of another two of said at least three switching means of said other set thereof, respectively.

5. A thermostat as set forth in claim 2 further comprising a pair of means operable generally for adjusting the sensing means to the respective ones of the adjusted positions thereof within the preselected temperature range thereof, respectively.

6. A thermostat as set forth in claim 5 wherein said adjusting means include means responsive to the operation of one of said adjusting means for effecting the operation of the other of said adjusting means so as to move the other of said sensing means associated therewith to a respective one of its adjusted positions wherein said other sensing means is ineffective in response to the temperature of the space.

7. A thermostat adapted to control a conditioning system for a space in response to the temperature therein, the conditioning system having an electrical heating apparatus and a heat pump operable generally in a two-stage heating mode and in a two-stage cooling mode with a changeover means for respectively enabling the heating and cooling modes, the thermostat comprising:

a pair of means movable in respective ones of adjusted positions thereof indicative of a selected temperature of the space for sensing the temperature of the space, respectively;

a pair of sets of at least three switching means associated with said sensing means and adapted for controlling the energization of the system, respectively, said at least three switching means of one of said sets thereof each having a predetermined trip point to successively effect the energization of the respective stages of the two-stage heating mode of the heat pump and the electrical heating apparatus in response to the temperature sensing movement of one of said sensing means and said at least three switching means of the other of said sets thereof each also having a predetermined trip point to successively effect the energization of the changeover means and the respective stages of the two-stage cooling mode of the heat pump in response to the temperature sensing movement of the other of said sensing means.

8. A thermostat as set forth in claim 7 further comprising at least three means disposed in heat transfer relation with said one sensing means and energized when said at least three switching means are at the predetermined trip points thereof for supplying anticipation heat to said one sensing means, respectively.

9. A thermostat as set forth in claim 8 wherein said at least three anticipation heat supplying means are respectively connected in series circuit relation with said at least three switching means, one of said at least three anticipation heat supplying means being connected in series circuit relation with at least another one of said at least three anticipation heat supplying means and said one anticipation heat supplying means and said at least another one anticipation heat supplying means are connected in parallel circuit relation with a third one of said at least three anticipation heat supplying means.

10. A thermostat as set forth in claim 7 further comprising at least two means disposed in heat transfer relation with said other sensing means and energized for supplying anticipation heat thereto when one of said at least three switching means of said other set is at the predetermined trip point thereof to effect the energization of the changeover means.

11. A thermostat as set forth in claim 10 wherein said at least two anticipation heat supplying means are deenergized when another two of said at least three switching means are at the predetermined trip points thereof to effect the energization of the respective stages in the two-stage cooling mode of the heat pump, respectively.

12. A thermostat as set forth in claim 7 further comprising a pair of temperature selector means operable generally for moving said sensing means to the respective ones of the adjusted positions thereof within a pair of preselected temperature ranges, respectively.

13. A thermostat as set forth in claim 12 further comprising means for moving one of said selector means and one of said one and other sensing means toward a respective one of the adjusted positions thereof so as to be ineffective in response to the temperature of the space upon the movement of the other of said temperature selector means and the other of said one and other sensing means to a respective one of the adjusted positions thereof.

14. A thermostat adapted to control a conditioning system for a space in which the thermostat may be located and with the conditioning system including an electrical heating apparatus, and a heat pump having first and second heating and cooling stages, respectively, and changeover means for respectively enabling the heating and cooling stages, the thermostat comprising:
electrical circuit means including a heating branch and a cooling branch, said heating branch being adapted to effect the selective energization of the first and second heating stages of the heat pump and also the electrical heating apparatus, and said cooling branch being adapted to effect the selective energization of the changeover means and the first and second cooling stages of the heat pump;
at least three means for supplying anticipation heat connected in said heating branch, one of said at least three anticipation heat supplying means being arranged in series circuit relation with at least another one of said at least three anticipation heat supplying means with said one and at least another one anticipation heat supplying means being connected in parallel circuit relation with a third one of said at least three anticipation heat supplying means and respectively energized concurrently with the first and second heating stages of the heat pump and the electrical heating apparatus upon the respective selective energization thereof by said heating branch; and
at least two other means for supplying anticipation heat connected in circuit relation in said cooling circuit so as to be concurrently energized with the changeover means of the heat pump upon the selective energization thereof by said cooling circuit, and said at least two other anticipation heat supplying means being thereafter respectively de-energized upon the respective selective energization of the first and second cooling stages of the heat pump.

15. A three-stage thermostat as set forth in claim 14 wherein said heating branch includes at least three switch means operable generally at different predetermined trip points for effecting the selective energization of the first and second heating stages of the heat pump and the electrical heating apparatus.

16. A thermostat as set forth in claim 15 further comprising means for sensing the temperature of the space and movable in response thereto to effect the operation of said at least three switch means.

17. A thermostat as set forth in claim 15 wherein said first named at least three anticipation heat supplying means are respectively connected in series circuit relation with said at least three switch means.

18. A thermostat as set forth in claim 14 wherein the cooling branch includes at least three switch means operable generally at different predetermined switch points for effecting the selective energization of the changeover means of the heat pump and the first and second cooling stages thereof.

19. A thermostat as set forth in claim 18 further comprising means for sensing the temperature of the space and movable in response thereto to effect the operation of said at least three switch means.

20. A thermostat as set forth in claim 14 wherein said electrical circuit means further includes means for selectively enabling said heating branch and said cooling branch.

21. A thermostat electrical circuit adapted to control the respective operation of an auxiliary heating apparatus and a two-stage heat pump having heating and cooling modes with a changeover device operable for selectively placing the heat pump in the heating and cooling modes, respectively, the circuit comprising:
a heating branch circuit;
a cooling branch circuit;
a first set of at least three switch means in said cooling branch circuit and selectively operable upon the occurrence of different temperature values between circuit making positions and circuit breaking positions, respectively, one of said switch means of said first set thereof being adapted for connection in circuit relation with the changeover device to effect the operation thereof so as to place the heat pump in its cooling mode when said one switch means of said first set is in its circuit making position and another two of said switch means of said first set being adapted for connection in circuit relation with the first stage and the second stage of the heat pump to effect the cooling mode operation thereof when said another two switches are in their circuit making positions, respectively;

a pair of means for interconnecting said heating circuit through respective parts of said cooling circuit in circuit relation with the first and second stages of the heat pump;

a second set of at least three switch means in said heating branch circuit and selectively operable upon the occurrence of other different temperature values between circuit making positions and circuit breaking positions, respectively, two of said switch means of said second set thereof being adapted for connection in circuit relation with the first and second stages of the heat pump to effect the heating mode operation thereof through said interconnecting means and said respective parts of said cooling circuit when said another two switch means of said second set are respectively in their circuit making positions and said one switch means of said first set is in its circuit breaking position to interrupt the circuit relation thereof with the changeover device so that the heat pump is placed in its heating mode and another one of said switch means of said second set being adapted for connection in circuit relation with the auxiliary heating apparatus to effect the heating operation thereof when said another one switch means is in its circuit making position.

22. A thermostat electrical circuit as set forth in claim 21 further comprising at least three means respectively connected in said heating branch circuit in circuit relation with said at least three switch means of said second set thereof for obviating the operation of the changeover device upon the operation of said at least three switch means of said second set to the circuit making position thereof when the heat pump is placed in its heating mode by the changeover device.

23. A thermostat electrical circuit as set forth in claim 21 further comprising at least three resistors adapted to be connected in circuit relation with the changeover device, two of said at least three resistors being connected in series circuit relation with two of said another two switch means and said another one switch means of said second set and another one of said at least three resistors being connected in parallel circuit relation with said two of said at least three resistors in order to obviate the operation of the changeover valve when the heat pump is placed in its heating mode by the changeover device.

24. A thermostat electrical circuit as set forth in claim 21 wherein said at least three switch means of said first set and said at least three switch means of said second set include a pair of means operable generally in response to the occurrence of the first named different temperature values and the other different temperature values to effect the selective operation of said at least three switch means of said first set and said at least three switch means of said second set to their circuit making positions, respectively.

25. A thermostat electrical circuit as set forth in claim 21 further comprising manual switch means for movement between a pair of circuit making positions, said manual switch means in one of the circuit making positions thereof being adapted for connecting said respective parts of said cooling circuit in circuit relation with the first and second stages of the heat pump and said manual switch means in the other of the circuit making positions thereof being adapted for connecting the auxiliary heating apparatus in circuit relation with one of said another two switch means of said second set through one of said interconnecting means.

26. A thermostat electrical circuit as set forth in claim 21 further comprising means for selectively enabling said heating branch circuit and said cooling branch circuit.

27. An electrical circuit for a thermostat having a pair of means movable therein for sensing the temperature of a given space in which the thermostat may be located, the electrical circuit comprising:

a heating branch circuit and a cooling branch circuit adapted to be respectively enabled;

a pair of sets of at least three switch means associated with said temperature sensing means and operable generally between circuit making and breaking positions in response to the movement of said temperature sensing means for controlling said heating branch circuit and said cooling branch circuit upon the enablement thereof, respectively; and at least three means connected in said heating branch circuit for supplying anticipation heat to one of the temperature sensing means in response to the movement of said at least three switch means of one of said sets thereof associated with the one temperature sensing means to the respective circuit making positions thereof when said heating branch circuit is enabled, said at least three anticipation supplying means being connected in star circuit relation with each other and respectively connected in series circuit relation with said at least three switch means of said one set thereof.

* * * * *

UNITED STATES PATENT AND TRADEMARK OFFICE
CERTIFICATE OF CORRECTION

PATENT NO. : 4,270,597

DATED : June 2, 1981

INVENTOR(S) : Dann W. Denny

It is certified that error appears in the above-identified patent and that said Letters Patent are hereby corrected as shown below:

```
Col.  1, line 55, delete "operation" and insert --operating--.
Col. 11, line 38, delete "operations" and insert --operation--.
Col. 15, line 20, delete "are" and insert --being--.
Col. 16, line 22, delete "three-stage".
```

Signed and Sealed this

Seventh Day of December 1982

[SEAL]

Attest:

GERALD J. MOSSINGHOFF

Attesting Officer

Commissioner of Patents and Trademarks